3,066,066
MINERAL FIBER PRODUCTS AND METHOD
OF PREPARING SAME
Gerald I. Keim, West Grove, Pa., and William Donald
Thompson, Middletown, Del., assignors to Hercules
Powder Company, Wilmington, Del., a corporation of
Delaware
No Drawing. Filed Mar. 27, 1958, Ser. No. 724,236
2 Claims. (Cl. 162—152)

This invention relates to the production of fibrous sheets, mats and other fibrous products from mineral fibers such as glass, mineral wool and asbestos fibers.

Mineral fibers may be formed into sheets from aqueous slurries in a manner similar to that utilized in the manufacture of paper. Such sheets, however, have little or no wet strength since there is no interfiber bonding.

A principal object of the present invention is the provision of a method for improving the interfiber bonding and the wet strength of fibrous mats, sheets and the like made from mineral fibers such as glass, mineral wool and asbestos fibers.

Another object of the invention is the provision of fibrous products of the indicated type having improved interfiber bonding and improved wet strength.

In accordance with the invention, the above and other objects are accomplished by treating the mineral fibers with an uncured thermosetting cationic resin comprising a water-soluble polymeric reaction product of epichlorohydrin and a polyamide derived from a polyalkylene polyamine and a saturated aliphatic $C_3$–$C_{10}$ dicarboxylic acid. It has been found that resins of this type improve interfiber bonding and impart wet strength to sheets, mats and the like prepared from mineral fibers. Moreover, such resins are substantive to mineral fibers so that they may be economically and effectively applied thereto while the fibers are in dilute aqueous suspension.

In the preparation of the cationic resins contemplated for use herein, the dicarboxylic acid is first reacted with the polyalkylene polyamine, preferably in aqueous solution, under conditions such as to produce a water-soluble polyamide containing the recurring groups

where $n$ and $x$ are each 2 or more and R is the divalent hydrocarbon radical of the dicarboxylic acid. This water-soluble polyamide is then reacted with epichlorohydrin to form the water-soluble cationic thermosetting resin.

The dicarboxylic acids utilized in preparing these resins are the saturated aliphatic dicarboxylic acids containing from 3 to 10 carbon atoms such as succinic, adipic, azelaic and so on. The saturated dicarboxylic acids having from 4 to 8 carbon atoms in the molecule are preferred. Blends of two or more of the saturated dicarboxylic acids may also be used.

A variety of polyalkylene polyamines including polyethylene polyamines, polypropylene polyamines, polybutylene polyamines and so on may be employed of which the polyethylene polyamines represent an economically preferred class.

More specifically, the polyalkylene polyamines contemplated for use may be represented as polyamines in which the nitrogen atoms are linked together by groups of the formula —$C_nH_{2n}$— where $n$ is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. The term "polyalkylene polyamine" employed in the claims, therefore, refers to and includes any of the polyalkylene polyamines referred to above or to a mixture of such polyalkylene polyamines.

It is desirable, in some cases, to increase the spacing of secondary amino groups on the polyamide molecule in order to change the reactivity of the polyamide—epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced by a molecularly equivalent amount of the diamine. Usually, a replacement of about 50% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products do not produce efficient resins for use herein when reacted with epichlorohydrin.

In converting the polyamide, formed as above described, to a cationic thermosetting resin, it is reacted with epichlorohydrin at a temperature from about 45° C. to about 100° C. and preferably between about 45° C. and 70° C. until the viscosity of a 20% solids solution at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction it may be desirable, in some cases, to add alkali to combine with at least some of the acid formed.

When the desired viscosity is reached, sufficient water is then added to adjust the solids content of the resin solution to the desired amount, i.e., about 10% more or less, the product cooled to about 25° C. and then stabilized by adding sufficient acid to reduce the pH at least to about 6 and preferably to about 5. Any suitable acid such as hydrochloric, sulfuric, nitric, formic, phosphoric and acetic acid may be used to stabilize the product. However, hydrochloric acid is preferred.

In the polyamide-epichlorohydrin reaction, it is preferred to use sufficient epichlorohydrin to convert all secondary amine groups to tertiary amine groups. However, more or less may be added to moderate or increase reaction rates. In general, satisfactory results may be obtained utilizing from about 0.5 moles to about 1.8 moles of epichlorohydrin for each secondary amine group of the polyamide. It is preferred to utilize from about 1.0 mole to about 1.5 moles for each secondary amine group of the polyamide.

The cationic polyamide—epichlorohydrin resins, prepared as herein described, may be applied to mineral fiber sheets, mats or the like by tub application or by spraying if desired. Thus, for example, a preformed and partially or completely dried sheet may be impregnated by immersion in, or spraying with, an aqueous solution of the resin following which the sheet may be dried in any convenient manner including air drying, drying on heated rolls, in heated tunnels, by means of infrared lamps or in ovens. The drying time will vary with the procedure. The rate of development of wet strength will vary directly with the rate of drying. However, by air drying one can obtain 80–100% of the strength obtained by oven drying. The resulting sheet has improved interfiber bonding and greatly increased wet strength.

The preferred method of incorporating these resins in such products, however, is by internal addition prior to sheet formation whereby advantage is taken of the substantivity of the resins to the mineral fibers. In practicing this method, an aqueous solution of the resin in its uncured and hydrophilic state is added to an aqueous suspension of mineral fibers in the beater, stock chest, Jordan engine, fan pump, headbox or at any other suitable point ahead of sheet formation. The sheet is then formed and dried in the usual manner, thereby curing the resin to its polymerized and water-insoluble condition and imparting wet strength to the sheet. Drying is preferably carried out at a temperature from about 105° C. to about 135° C. and for a period of time from about 0.5 minute to about 5 minutes. Curing of the resin may be effected under acid, neutral or alkaline conditions, i.e., at pH's from about 4.0 to 10.0. Curing under alkaline conditions at a pH from about 7.0 to about 10.0 is preferred.

The pH of the pulp slurry prior to sheet formation is not critical and may be varied from about 4.0 to about 10.0 as long as the particular pH used does not seriously affect the particular fiber employed. However, slightly better interfiber bonding is obtained under neutral or slightly alkaline conditions and, hence, the preferred range of pH of the pulp slurry is from about 7.0 to about 10.0.

Any mineral fibers of a neutral or alkaline composition such as glass and mineral wool or asbestos fibers and mixtures of these may be used to form the improved fibrous products of the invention. Moreover, since the cationic resins herein utilized are also substantive to cellulose fibers, the process of the invention may be utilized in the preparation of improved products from mineral fibers admixed with smaller quantities, i.e., from about 20% to 40%, of cellulose fibers.

The quantity of aqueous cationic resin solution to be used will vary with a number of factors such as the particular type of product being made, the types of fibers utilized, the particular resin composition and so on. In some cases, as little as 0.5% of the resin (resin solids based on the dry weight of fiber) may be employed. In other cases, as much as 15% of the resin (resin solids based on the dry weight of fiber) may be employed. For most applications, however, from about 1.0% to about 5.0% of the resin (resin solids based on the dry weight of fiber) will be found satisfactory and hence is preferred. When the above ranges are used, the amount of resin solids adsorbed by the fibers will usually vary from about 0.4% to about 12% for the broad range and from about 0.8% to about 4.0% for the preferred range. These percentage figures are by weight based on the weight of dry fiber.

Any suitable or convenient concentration of resin solution may be utilized. Concentrations from about 1% to about 10% will be found satisfactory for most purposes. Higher concentrations may be utilized if the resin is stabilized or so utilized that gelation does not take place prior to use.

The following examples will illustrate the invention.

EXAMPLE 1

225 grams (2.18 moles) of diethylenetriamine and 100 grams of water were placed in a 3-necked flask equipped with a mechanical stirrer, thermometer and condenser. To this was added 290 grams (2.0 moles) of adipic acid. After the acid had dissolved in the amine, the solution was heated to 185–200° C. and held there for 1½ hours. Then vacuum from a water pump was applied to the flask during the period required for the contents of the flask to cool to 140° C. following which 430 grams of water was added. The polyamide solution contained 52.3% solids and had an acid number of 2.1.

To 60 grams of this polyamide solution in a round-bottom flask was added 225 grams of water. This solution was heated to 50° C. and 12.5 grams of epichlorohydrin was added dropwise over a period of 11 minutes. The contents of the flask were then heated to 60–70° C. until it had attained a Gardner viscosity of >E. Then 150 grams of water was added to the product, and it was cooled to 25° C. 11 ml. of 10% HCl was then added to adjust the pH to 5.0. The product contained 9.0% solids and had a Gardner-Holdt viscosity of C–D.

4 grams of asbestos fiber was mixed in a Waring Blendor for 2 minutes with 600 ml. of water. To this was added 80 grams of an 0.1% aqueous solution of the resin, prepared as above described (2% resin based on dry fiber weight). The slurry was stirred for 2 minutes and then formed into a mat by means of a handsheet mold. The mat was pressed and drum dried. Other asbestos fiber sheets were formed as above except that the resin was omitted. The sheets were soaked for 30 minutes in distilled water after which they were removed from the water, blotted to remove excess water and then tested for wet strength with a Mullen burst tester. Results are given in Table I below.

*Table 1*

| Percent Resin Added Based on Dry Fiber Weight | Wet Strength (Mullen) lb./sq. in. |
|---|---|
| 2 | 5.1. |
| 0 | Nil (Sheets could not even be removed from water in which they were soaked). |

EXAMPLE 2

Handsheets were prepared from asbestos fiber by stirring 4.0 grams of fiber with 600 ml. of water for 2 minutes in a Waring Blendor. Then an 0.1% aqueous solution of the resin, prepared as in Example 1, was added and the pulp slurry was stirred for an additional 5 minutes. The handsheets were formed on a circular 6-in. sheet mold, pressed and drum dried. The dry sheets were given an additional cure of 1 hour in an oven at 105° C. They were then soaked in distilled water for 30 minutes and tested for wet strength using a Mullen burst tester. Results are given in Table 2 below.

Table 2

| Percent Resin Added Based on Dry Fiber Weight | Wet Strength (Mullen) lb./sq. in. |
|---|---|
| 2 | 4.4 |
| 2 | 4.5 |
| 4 | 5.6 |
| 4 | 5.0 |
| 0 | 1.0 [1] |
| 0 | 1.0 [1] |

[1] These sheets could not be removed from water without disintegrating

EXAMPLE 3

Handsheets were prepared from a blend of 75% glass fiber and 25% Tacoma bleached kraft pulp. They were formed in a circular sheet mold 6 in. in diameter. A slurry was made of 2.25 grams of glass fiber plus 0.75 gram of Tacoma bleached kraft pulp in 300 ml. of water. This was stirred for 2 minutes in a Waring Blendor. The pH was adjusted to 9.5 with 10% NaOH and 360 grams of an 0.1% solution of the resin, prepared as in Example 1 (12% solids based on dry fiber), was added. After stirring for 2 minutes, the slurry was formed into a sheet, pressed and drum dried. A similar sheet was prepared except that no resin was added. Both sheets were soaked for 30 minutes in distilled water and then tested with a Mullen burst tester for wet strength. Results are given in Table 3 below.

Table 3

| Percent Resin Added Based on Dry Fiber Weight | Wet Burst, lb./sq. in. |
|---|---|
| 12 | 5.0 |
| 0 | (Too weak to test.) |

The examples illustrate the improvement in wet strength of mineral fiber sheets obtained utilizing the polyamide-epichlorohydrin resins herein described. While preferred embodiments of the invention have been exemplified and described herein, the invention is not to be construed as limited thereby except as the same may be included in the following claims.

We we claim and desire to protect by Letters Patent is:

1. A paper product having improved wet strength consisting of mineral fibers impregnated with from about 0.4% to about 12%, based on the dry weight of fiber, of a dried residue of an aqueous solution of a cationic thermosetting resin, said resin comprising a water-soluble reaction product obtained by (1) reacting a $C_3$–$C_{10}$ saturated aliphatic dicarboxylic acid with a polyalkylene polyamine having two primary amine groups and at least one secondary amine group in a mole ratio of polyalkylene polyamine to dicarboxylic acid of from about 0.9:1 to about 1.2:1 and at a temperature from about 160° C. to about 210° C. to form a polyamide containing secondary amine groups, and (2) reacting the polyamide with epichlorohydrin at a temperature from about 45° C. to about 70° C. and in a ratio of epichlorohydrin to secondary amine groups of said polyamide of from about 1.0:1 to about 1.5:1, said resin having been cured to a water-insoluble state after impregnation of said product therewith.

2. A product in accordance with claim 1 in which the dicarboxylic acid is a $C_4$–$C_8$ saturated aliphatic dicarboxylic acid.

References Cited in the file of this patent

UNITED STATES PATENTS

| | | |
|---|---|---|
| 2,260,024 | Hall et al. | Oct. 21, 1941 |
| 2,582,840 | Maxwell | Jan. 15, 1952 |
| 2,601,597 | Daniel et al. | June 24, 1952 |
| 2,694,633 | Pattilloch | Nov. 16, 1954 |
| 2,765,229 | McLaughlin | Oct. 2, 1956 |
| 2,832,746 | Jackson | Apr. 29, 1958 |
| 2,832,747 | Jackson | Apr. 29, 1958 |
| 2,849,411 | Lehmann et al. | Aug. 26, 1958 |
| 2,926,116 | Keim | Feb. 23, 1960 |
| 2,926,154 | Keim | Feb. 23, 1960 |